United States Patent [19]

Nishikawa et al.

[11] 4,083,055
[45] Apr. 4, 1978

[54] EXPOSURE INFORMATION QUANTIZING CIRCUIT UTILIZING SHIFT REGISTER

[75] Inventors: Yukiyasu Nishikawa, Kawagoe; Takuo Itagaki, Wako, both of Japan

[73] Assignee: Asahi Kogaku Kogyo Kabushiki Kaisha, Tokyo, Japan

[21] Appl. No.: 667,533

[22] Filed: Mar. 17, 1976

[30] Foreign Application Priority Data

Mar. 20, 1975 Japan .................................. 50-33862

[51] Int. Cl.² .............................................. G03B 7/08
[52] U.S. Cl. .................................. 354/23 D; 354/24; 354/60 L; 354/60 A
[58] Field of Search ................... 354/23 D, 24, 51, 53, 354/60 A, 60 L

[56] References Cited

U.S. PATENT DOCUMENTS 3,863,263  1/1975  Itagaki .................................... 354/24

FOREIGN PATENT DOCUMENTS 2,457,306  6/1975  Germany ........................... 354/23 D Primary Examiner—Russell E. Adams
Attorney, Agent, or Firm—Christie, Parker & Hale

[57] ABSTRACT

An exposure information quantizing circuit. A current signal source generates a signal current to be quantized. A controllable bidirectional shift register has a series of bit positions and corresponding signal receiving outputs and is operable to shift a bit sequentially from one position to the next. Each position corresponds to a different divisional range of the signal to be quantized. A unique signal appears only at the output corresponding to the position containing a bit. Means comprises at least one further reference current source responsive to the outputs of the shift register for forming at least a pair of signals corresponding to opposite ends of the divisional range for each output of the shift register. A first logarithmic compression means is coupled to the signal current source for forming a first reference voltage proportional to the logarithm of the signal current. At least one further logarithmic compression means is coupled to the at least one further reference current source for causing the pair of signals to form first and second reference signals proportional to the logarithm of the at least one further reference current source. A voltage comparator forms a direction of shift control signal for the shift register in accordance with comparison thereby of the magnitude of the signal voltage with that of the first and second reference voltages. A source of shift control pulses is provided for the shift register.

9 Claims, 6 Drawing Figures

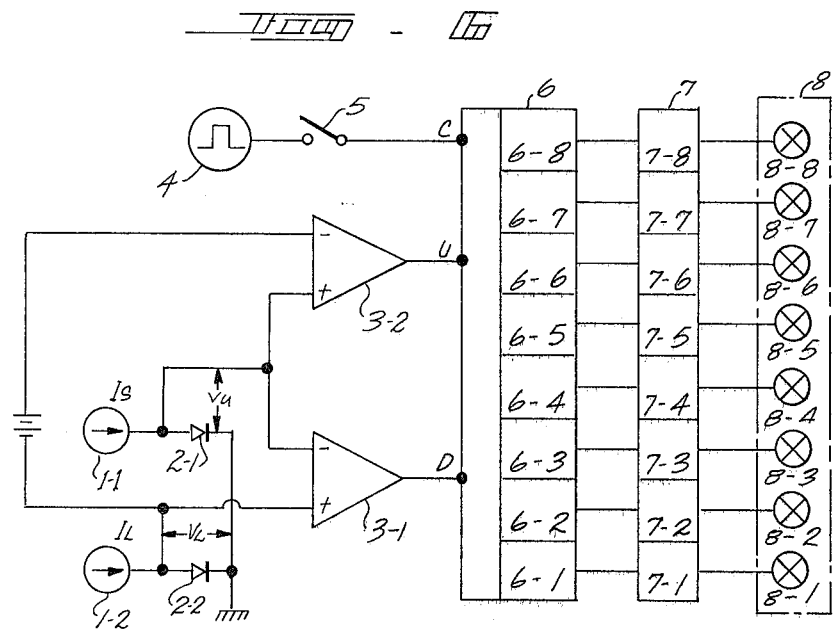

EXPOSURE INFORMATION QUANTIZING CIRCUIT UTILIZING SHIFT REGISTER

BACKGROUND

The present invention relates to a signal quantizing circuit for a photographic camera or an exposure meter for indicating exposure information such as exposure time, object brightness, utilizing a plurality of lamps instead of an ammeter.

The ammeter, conventionally utilized for indication of exposure information, is liable to get out of order due to mechanical shocks, resulting in frequent trouble. The present invention provides an input information quantizing circuit for highly reliable indication utilizing a plurality of indicating lights or elements without movable parts, such as electric lamps, light emission diodes, etc., instead of the less reliable ammeter.

Information about several similar known devices has been published. Most of these devices utilize values indicated by a counter for quantization. According to this method, (1) the value indicated by a counter varies only by "1", so that the response time for variation of signal of constant ratio is proportional to the value, that is, a large value requires a long response time, while a small value requires a short response time; (2) the resolution of quantization is simply determined by the minimum weight bit, so that for larger values the quantization is unnecessarily minute; and (3) a relatively large scale decoder is required for indication. These are drawbacks in practical use for indication of exposure information which vary exponentially over a wide range.

BRIEF STATEMENT OF THE INVENTION

An embodiment of the present invention elemenates the drawbacks of such conventional quantizing circuits.

Such an embodiment comprises an exposure information quantizing circuit. A current signal source generates a signal current to be quantized. A controllable bidirectional shift register has a series of bit positions and corresponding signal receiving outputs and is operable to shift a bit sequentially form one position to the next. Each position corresponds to a different divisional range of the signal to be quantized. A unique signal appears only at the output corresponding to the position containing a bit. Means comprises at least one further reference current source responsive to the outputs of the shift register for forming at least a pair of signals corresponding to opposite ends of the divisional range for each output of the shift register. A first logarithmic compression means is coupled to the signal current source for forming a first reference voltage proportional to the logarithm of the signal current. At least one further logarithmic compression means is coupled to the at least one further reference current source for causing the pair of signals to form first and second reference signals proportional to the logarithm of the at least one further reference current source. A voltage comparator forms a direction of shift control signal for the shift register in accordance with comparison thereby of the magnitude of the signal voltage with that of the first and second reference voltages. A source of shift control pulses is provided for the shift register.

DRAWINGS

FIG. 6 is an alternate embodiment of the invention.

DESCRIPTION

Figure 1:
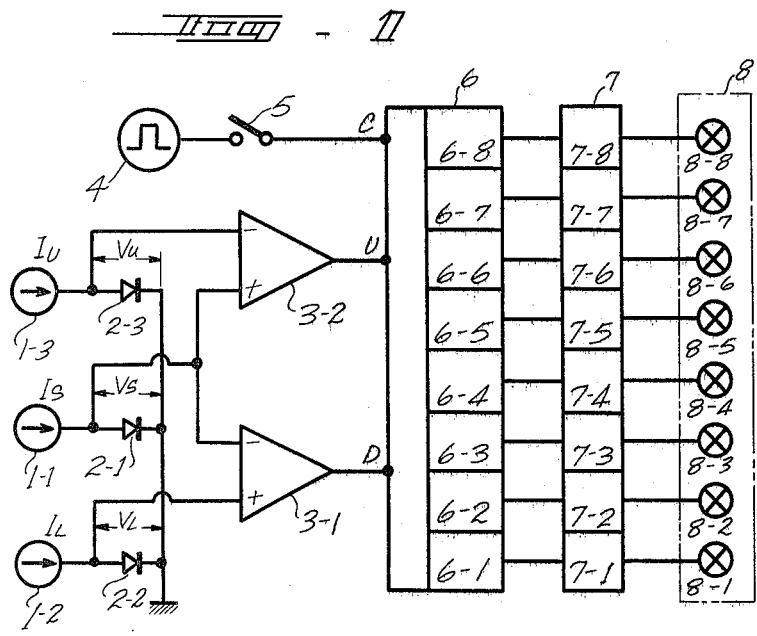
FIG. 1 is a circuit diagram of one example of the present invention.
Figure 4:
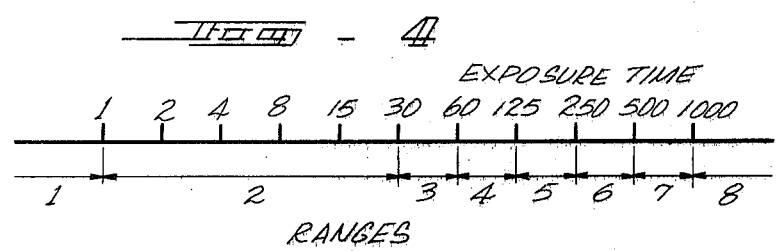
FIG. 4 shows the exposure time ranges of the bits of the shift register of the example.

FIG. 1 discloses an arrangement wherein indication is made with eight indicating lights or elements 8 for the exposure time range for an electric shutter camera. The exposure time range is divided into eight stages 8-1 to 8-8 as shown in FIG. 4. A signal current source 1-1 is so arranged that its current value $I_S$ is inversely proportional to the exposure time. The practical circuit arrangement of signal current source 1-1 is known in the electric shutter art and needs no further description. A lower-limit reference current source 1-2 and an upper-limit reference current source 1-3 are provided, whose current values $I_L$ and $I_U$ vary according to the contents of a bidirection shift register 6, respectively. The currents from current sources 1-1, 1-2 and 1-3 flow into the connected logarithmic compression diodes 2-1, 2-2 and 2-3, respectively, and produce the signal voltage $V_S$, the lower limit reference voltage $V_L$, and the upper limit reference voltage $V_U$, which are proportional to the logarithms of the currents, respectively, between the anode and the cathode of the corresponding diodes. These voltages are applied to the inversion inputs or the non-inversion inputs of the voltage comparators 3-1 and 3-2. Each voltage comparator compares the voltage applied at its input and, when the voltage applied to the inversion input is lower than the voltage applied to the non-inversion input, there is produced a logic "1," while, when the former is higher than the latter, there is produced a logic "0." The outputs of the voltage comparators 3-1 and 3-2 are connected to the shift control terminals for up, U, and for down, D, of the bidirection shift register, respectively.

A conventional clock or pulse generator 4 generates pulses with a constant time period and is connected to the clock terminal, C, of the bidirection shift register 6 through a memory switch 5. The bidirection shift register 6 is of eight bit or state structure corresponding to the number of divisions of the exposure time variation range. A unique output signal is formed at a unique one of eight output circuits corresponding to each of the eight states of the counter. The bits correspond to the exposure time ranges of FIG. 4. In turn, the first bit or state corresponds to the exposure time of more than one second, the second bit or state corresponds to the exposure time of from 1 second to 1/30th second, the third bit or state corresponds to the exposure time of from 1/30th second to 1/60th second, etc. The bidirection shift register 6 is so arranged that, in the initial condition due to connection of the power source, only one bit of the eight bits is in logic "1" and all the other bits are logic "0". This logic "1" bit is hereinafter referred to as the "index". In the same manner as conventional shift registers, this index operates, in response to the signals applied to the shift control terminals U and D and every time a pulse is applied to the clock input terminal C, as follows:

(i) when U = "1" and D = "0," one bit shift upwards;

(ii) when U = "0" and D = "1," one bit shift downwards; and (iii) when U = "0" and D = "0," non-operation.

The shift register is further arranged so that, when the shifting index has reached the end bit of the counter and a signal continues to be applied to the shift control terminals in the same direction, the index remains at the end bit. For such function it is necessary only to employ the logical sum of the outputs of the end bit and the preceding bit as the input to the end bit. No further detailed description is required. Accordingly, there always exists a single index appearing upon connection of the power source. This index does not disappear nor increase in number in any case, and moves in the shift register in response to the signals applied to the shift control terminal. The outputs of the bits of the bidirection shift register 6 are connected to the indicating elements 8 through respective drivers 7 so that only the indicating element connected to the bit having the index is lighted.

The relation between the current values of the reference current source and the position of the index in the shift register is as follows. The current value $I_L$ of the lower limit reference current source 1-2 and the current value $I_U$ of the upper limit reference current source 1-3 are arranged to correspond to the lower limit value and the upper limit value, respectively, of the range of current intensity corresponding to the exposure time range of the bit which has the index at the time.

Figure 2:
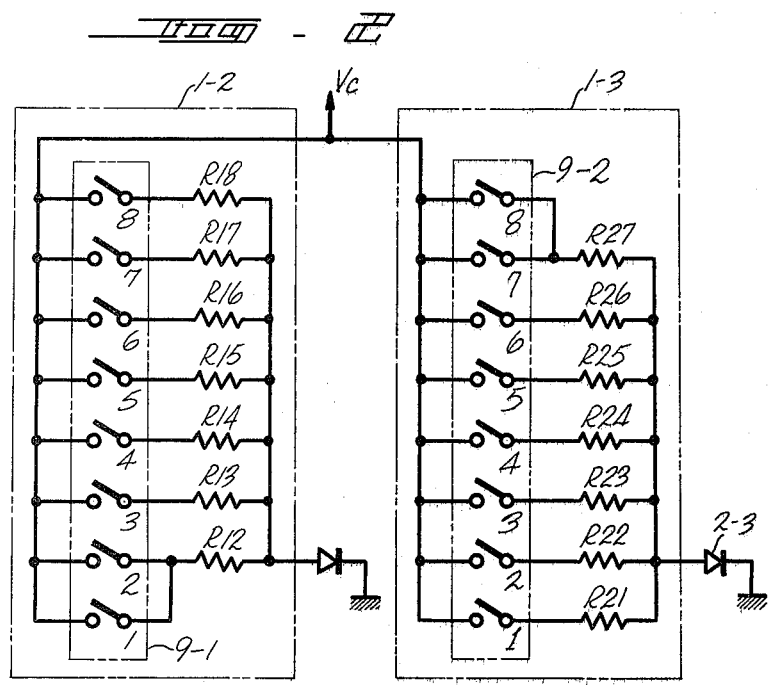
FIG. 2 shows one detailed example of the reference current source which is schematically shown in the circuit diagram of FIG. 1.

By way of example, FIG. 2 shows current sources in which the switches of switch groups 9-1 and 9-2 correspond, from bottom to top respectively, to the bits 1 – 8 of the shift register 6. Arrangement is so made that only the switch corresponding to the bit having the index is closed and all other switches remain open. The switches are shown schematically in FIG. 2 and are actually semiconductor transistor switches, by way of example. One terminal of each of the switches 9-1 and 9-2 are connected together and then connected to a power source (not shown) of a constant voltage $V_C$ while the other terminals are connected to weighted resistors $R_{12}$ – $R_{18}$ and $R_{21}$ – $R_{27}$, respectively. The values of the weighted resistors $R_{12}$ and $R_{21}$ are equal, and when the switches connected in series with them are closed, current flows through them corresponding to the exposure time of one second. The values of other weighted resistors are so selected that they satisfy the following relationships:

$R_{12} = 30R_{13} = 60R_{14} = 125R_{15} = 250R_{16} = 500R_{17} = 1000R_{18}$, $R_{21} = 30R_{22} = 60R_{23} = 125R_{24} = 250R_{25} = 500R_{26} = 1000R_{27}$.

As a result, there are obtained, in accordance with the position of the index, the lower limit reference current and the upper limit reference current corresponding to the ranges of each of the bits.

This circuit carries out quantization of the input signal in the following manner:

If the index in counter 6 is at a bit corresponding to an exposure time range which is longer than the signaled exposure time, the signal current $I_S$ is greater than the reference currents $I_L$ and $I_U$. As a result the signal voltage $V_S$ is higher than the reference voltages $V_L$ and $V_U$ and the outputs of the voltage comparators 3-1 and 3-2 are logic "0" and logic "1," respectively. In this state, when a clock pulse is applied to the shift register, the index is shifted in counter 6 upwards by one bit. This increases the reference currents $I_L$ and $I_U$ by one stage and hence the reference voltages $V_L$ and $V_U$ are also increased by one stage.

The next outputs of the voltage comparators 3-1 and 3-2 are determined through the increased reference voltages $V_L$ and $V_U$ and the signal voltage $V_S$. If the signal voltage $V_S$ is still higher than the reference voltages $V_L$ and $V_U$, the next clock pulse causes the index to be shifted upwards by one additional bit. When the signal voltage $V_S$ is between the upper reference voltage $V_U$ and the lower reference voltage $V_L$, both of the outputs of the voltage comparators 3-1 and 3-2 are logic "0." As a result the index in counter 6 is not shifted by the clock pulse.

If, contrary to the prior example, the index in counter 6 is at a bit corresponding to an exposure time which is shorter than the signaled exposure time, the index is shifted to the bit which contains the signaled exposure time within its range and is stopped, in the same manner as the above mentioned example but with a reversed shift direction.

The above mentioned operation is carried out even if the signaled exposure time varies with time. Thus, the index follows the varying signal in the shift register so that the signaled exposure time is contained in the range of the bit having the index. The exposure time is indicated by the one of the eight indicating elements which is lighted. The result of quantization can be held or memorized at any suitable time by opening the memory switch 5, thereby preventing the pulses from the pulse generator 4 from being applied.

Figure 3:
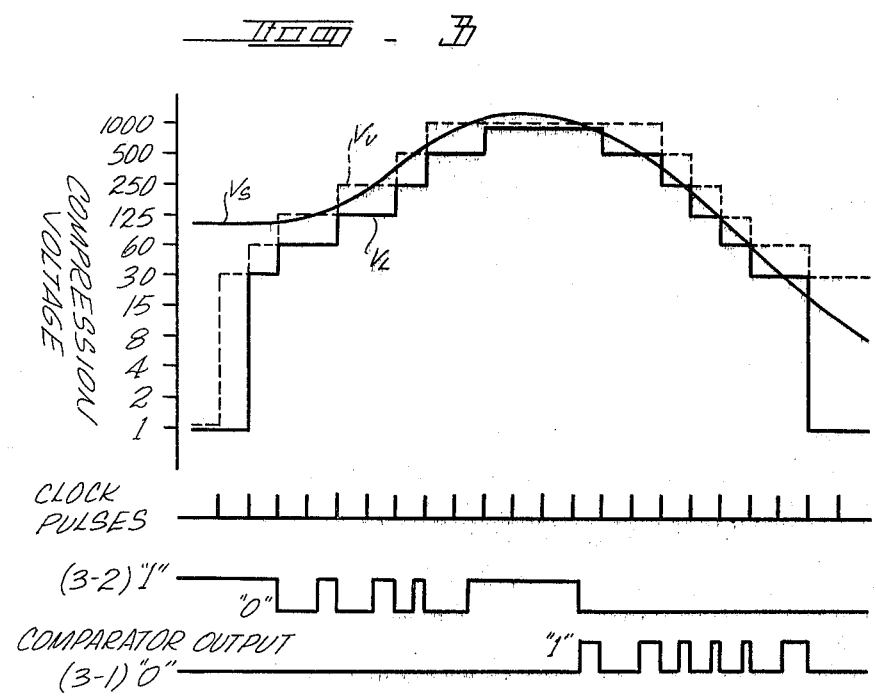
FIG. 3 is a graph showing the variation of the voltage and the state for indicating the operation of the example.

FIG. 3 is a graph of the signals of the above mentioned operation with time plotted along the abscissa axis.

In the above description the neighboring bit ranges are continuous. However, the invention is not limited thereto according to another embodiment of the invention. By way of example, FIG. 5-(1) illustrates an arrangement where a gap is provided between two neighboring bit ranges and FIG. 5-(ii) illustrates an arrangement where a part of the bit range of each of the neighboring bits is overlapped with each other. According to FIG. 5-(i), when the input signal is in the gap portion, the index in counter 6 reciprocates in the neighboring two bit ranges on both sides of the gap. To the unaided eye it appears that two indicating elements are simultaneously lighted.

Figure 5:
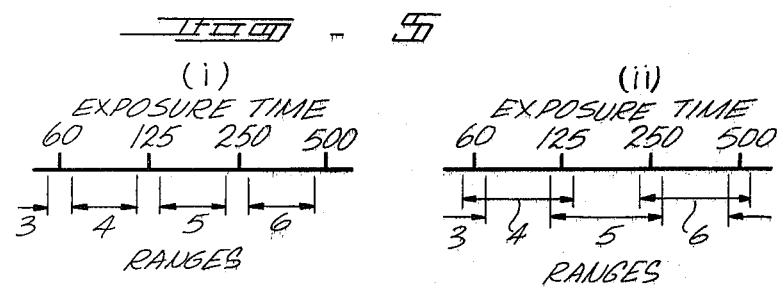
FIG. 5 shows, partially, two systems for establishing the relation between the bits and the exposure time ranges except for the system shown in FIG. 4.

According to FIG. 5-(ii) a hysteresis characteristic appears in the response of the quantization circuit to the variation of input signal. According to the quantized signal indication illustrated in FIG. 5-(i), it is possible to approximately double the resolution with a shift register of the same number of bits.

While in the above description the exposure time is quantized into eight stages, the number of divisions and the ranges is arbitrary. Further, in the above description, in the intermediate bits, each of the five bits (from the third bit to the seventh bit) has a range which is logarithmically equal in length, while only the second bit has a length which is five times as long as the former length. This requires two sets of reference current sources and logarithmic compression elements. If, however, each of the intermediate bits has a range which is logarithmically equal in lenght, one set of the reference current source and the logarithmic compression element is sufficient. This one set will provide the first reference voltage corresponding to one end of the index bit range. Arrangement is further made so that a constant voltage corresponding to the length of the range is offset, that is, added to or subtracted from the first reference voltage so as to provide the second reference voltage corresponding to the other end of the index bit range. FIG. 6 depicts such an arrangement wherein the offset is taken from the voltage $V_L$, using a battery.

The above described quantizing circuit is especially effective for quantizing exposure information varying exponentially over a wide range such as object brightness as well as such information as exposure time, etc. This makes it possible to provide a highly reliable exposure information indicating means which employs no ammeter. This quantizing circuit has the following advantages over conventional counter-system quantizing circuits:

(i) The speed of response is uniform and great over the entire range in variation of signal; further, resolution of quantization can be arbitrarily established;

(ii) Since no decoder is required in coupling to the indicating circuit, the circuit arrangement is simplified;

(iii) Since establishment of the range of each bit can be carried out with great flexibility, an integrated circuit containing the bidirection shift register, the voltage comparator, the logarithmic compression element and the driver section can be provided for various purposes as occasion demands.

Although an exemplary embodiment of the invention has been disclosed for purposes of illustration, it will be understood that various changes, modifications and substitutions may be incorporated into such embodiment without departing from the spirit of the invention as defined by the claims appearing hereinafter.

What is claimed:

1. An exposure information quantizing circuit for photographic cameras comprising a signal current source for generating a signal current to be quantized; a bidirection shift register having a series of multiple bits corresponding in turn to the ranges of division required in the expected variation in range of the signal, and which is so arranged that an index is always present only at one bit; a first reference current source for producing a current corresponding to one end of the range of the bit having the index; a second reference current source for producing a current corresponding to the other end of said range; logarithmic compression elements connected respectively to the signal current source, the first reference current source and the second reference current source to respectively obtain a signal voltage, a first reference voltage and a second reference voltage, which are respectively proportional to the logarithm of the corresponding current values; a voltage comparator for forming a shift control signal for said bidirection shift register in accordance with comparison thereby of the magnitude of the signal voltage with that of the first reference voltage or the second reference voltage; and a pulse generator for providing clock pulses for said bidirection shift register.

2. An exposure information quantizing circuit for photographic cameras comprising a signal current source for generating a signal current to be quantized; a bidirection shift register having a series of multiple bits corresponding in turn to the ranges of division required in the expected variation in range of the signal, and which is so arranged that an index is always present only at one bit; means comprising at least one reference current source for producing at least a pair of signals corresponding to opposite ends of the range of the bit having the index; a first logarithmic compression element connected to the signal current source for producing a first reference voltage proportional to the logarithm of the signal current source; and at least one further logarithmic compression element connected to said at least one reference current source for causing said pair of signals to be first and second reference signals proportional to the logarithm of said further current source; a voltage comparator for forming a shift control signal for said bidirection shift register in accordance with comparison thereby of the magnitude of the signal voltage with that of the first reference voltage or the second reference voltage; and a pulse generator for providing clock pulses for said bidirection shift register.

3. An exposure information quantizing circuit for photographic cameras according to claim 2 wherein the intermediate bits of the bidirection shift register corresponds in turn to ranges due to logarithmically equal division of the variation range of the signal, respectively, and wherein said at least one reference current source produces a current corresponding to one end of the range of the bit having the index to thereby form said first reference voltage, and means for obtaining a substantially constant voltage offset from said first reference voltage, corresponding to the width of one range, to thereby form the second reference voltage.

4. An exposure information quantizing circuit comprising:

a current signal source for generating a signal current to be quantized;

a controllable bidirectional shift register having a series of bit positions and corresponding signal receiving outputs and operable to shift bit sequentially from one position to the next, each position corresponding to a different divisional range of the signal to be quantized, a unique signal appearing only at the output corresponding to the position containing a bit;

means comprising at least one further reference current source responsive to the outputs of said shift register for forming at least a pair of signals corresponding to opposite ends of the divisional range for each output of the shift register;

a first logarithmic compression means coupled to the signal current source for forming a signal voltage proportional to the logarithm of the signal current;

at least one further logarithmic compression means coupled to said at least one further reference current source for causing said pair of signals to form first and second reference signals proportional to the logarithm of said at least one further reference current source;

a voltage comparator for forming direction of shift control signals for said shift register in accordance with comparison thereby of the magnitude of the signal voltage with that of the first and second reference voltages; and a source of shift control pulses for said shift register.

5. An exposure information quantizing circuit according to claim 4 wherein intermediate bit positions of the shift register correspond in turn to outputs and divisional ranges, the latter of which are equal in width, and wherein said at least one reference current source produces a current corresponding to one end of the range of the bit having the index to thereby form said first reference voltage, and additionally comprising means for obtaining a substantially constant voltage offset from said first reference voltage corresponding to the width of one divisionl range to thereby form said second reference voltage.

6. An exposure information quantizing circuit according to claim 4 wherein said means comprises first and second reference current sources for producing separate current signals corresponding to opposite ends of each divisional range, and wherein said means comprises first and second logarithmic compression elements connected, respectively, to the first and second signal current sources to produce said first and second reference voltages.

7. An exposure information quantizing circuit according to claim 4 comprising means for removing the pulses from the shift register.

8. An exposure information quantizing circuit according to claim 4 comprising an indicator for indicating the position in the shift register containing the bit.

9. An exposure information quantizing circuit according to claim 8 wherein said indicator comprises a separately energizable light means controlled by each said output of said shift register.

* * * * *

UNITED STATES PATENT AND TRADEMARK OFFICE
CERTIFICATE OF CORRECTION

PATENT NO. : 4,083,055
DATED : Apr. 4, 1978
INVENTOR(S) : Nishikawa et al.

It is certified that error appears in the above-identified patent and that said Letters Patent are hereby corrected as shown below:

Column 1, line 24, after "of" (second occurrence) insert -- a --; line 36, "eleminates" should be -- eliminates --; line 43, "form" should be -- from --.
Column 2, line 64, "in" should be -- is --.
Column 4, line 66, "lenght" should be -- length --.
Column 6, claim 3, lines 19-20, "corresponds" should be -- correspond --; claim 4, line 35, after "shift" insert -- a --.
Column 7, claim 5, line 3, "division1" should be -- divisional --.

Signed and Sealed this

Fifth Day of September 1978

[SEAL]

Attest:

RUTH C. MASON
Attesting Officer

DONALD W. BANNER
Commissioner of Patents and Trademarks